Figure 4:
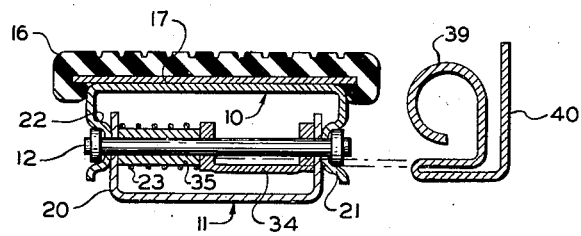

Oct. 11, 1949.    H. B. RODD    2,484,592
ADJUSTABLE ACCELERATOR PEDAL
Filed Oct. 8, 1946    3 Sheets-Sheet 1
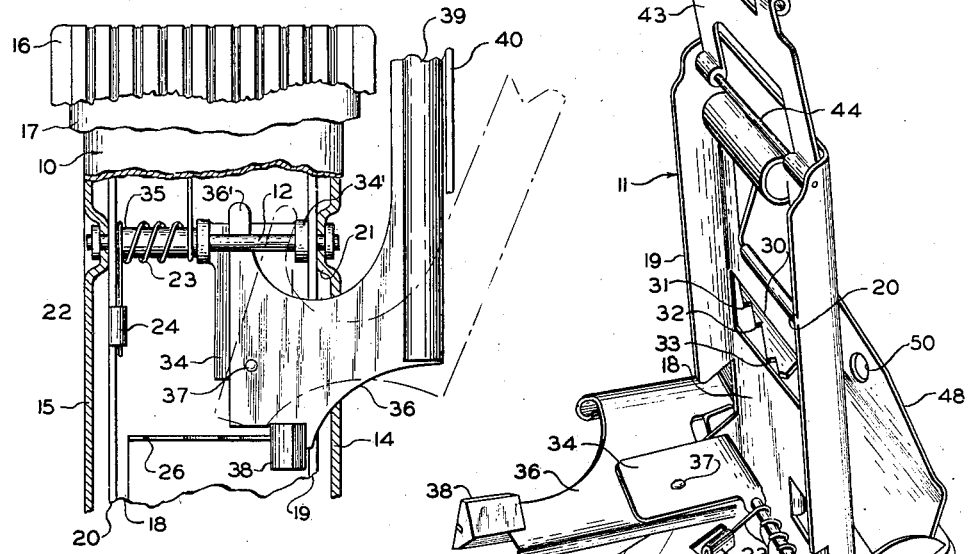
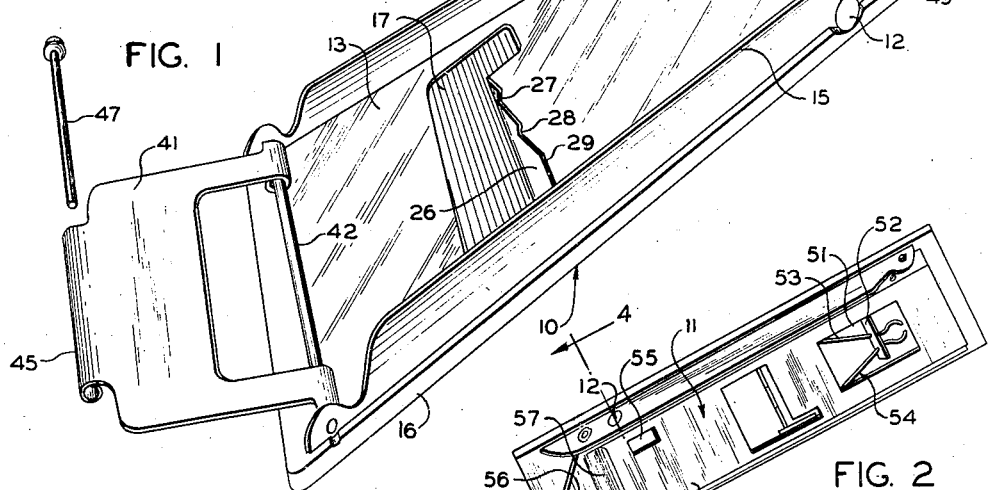
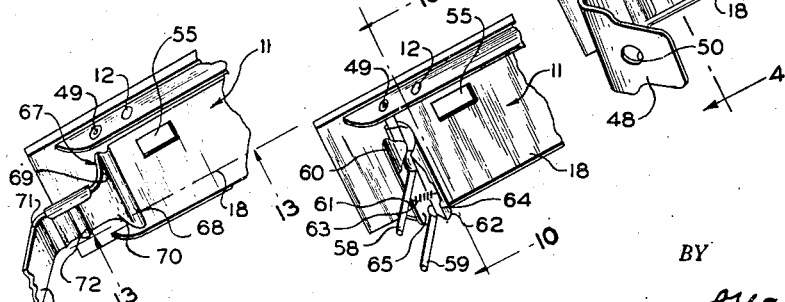
INVENTOR.
H. B. RODD
BY
A. Yates Dowell
ATTORNEY Oct. 11, 1949.                H. B. RODD                 2,484,592
                      ADJUSTABLE ACCELERATOR PEDAL
Filed Oct. 8, 1946                                 3 Sheets-Sheet 2

INVENTOR.
H. B. RODD
BY
A. Yates Dowell
ATTORNEY

Oct. 11, 1949.   H. B. RODD   2,484,592
ADJUSTABLE ACCELERATOR PEDAL
Filed Oct. 8, 1946   3 Sheets-Sheet 3

INVENTOR.
H. B. RODD
BY
A. Yates Dowell
ATTORNEY

Patented Oct. 11, 1949

2,484,592

UNITED STATES PATENT OFFICE 2,484,592

ADJUSTABLE ACCELERATOR PEDAL

Houston B. Rodd, Trona, Calif.

Application October 8, 1946, Serial No. 701,881

19 Claims. (Cl. 74—513)

1

This invention relates to improvements in automotive vehicles and particularly to an improved foot operated throttle control or accelerator pedal for such a vehicle.

Accelerator pedals in use at present ordinarily consist of a single flat member hingedly or pivotally connected at one end to the vehicle floor boards and pivotally connected at the opposite end to a throttle operated shaft extending through the floor boards. Such a control has a single angular relationship to the floor boards for each position of the throttle.

This condition results in extreme fatigue and discomfort of the driver particularly when a vehicle is driven for a long period of time at a substantially constant speed. Proper manipulation of the foot operated throttle control requires a high degree of skill as the control must be extremely steady and accurate. Maintaining the foot pedal at the same position over a long period results in undue nervous tension, muscular fatigue and muscular cramps due to the necessity of maintaining substantially the same posture for an extended period.

This type of foot operated control also has no facility by means of which it can be accommodated to drivers of different height and build. For example, when the front seat of a vehicle is moved forwardly or rearwardly to accommodate drivers of different heights the angular position of the driver's foot relative to the floor boards of the vehicle and to the accelerator pedal is changed. Thus, a pedal angle that might be entirely comfortable for a tall driver will be exceedingly uncomfortable for a shorter driver who requires that the seat be moved forward, thus involving a shorter angle between the driver's foot resting on the accelerator pedal and the portion of the leg above the ankle.

The conventional accelerator pedal also cannot be adjusted to compensate for difference in the height of shoe heels worn by different drivers. For example, a man's shoe has a low broad heel which normally places his foot at a comfortable angle on the accelerator pedal. The heels of women's shoes, however, vary in height, four main classes of heels being recognized—such as low heels, cuban heels, medium heels and high or spike heels. Each different height of shoe heel involves a different position of the foot relative to the ankle and leg when the shoe is placed on the accelerator pedal and a high heel can cause extreme muscular and nervous fatigue when used with a pedal designed for operation by a driver wearing a flat heel shoe. An attempt to use a

2 high heel shoe on such an accelerator pedal also results in a loss of controlling skill so that it is usually impossible for a woman in high heel shoes to drive as well as a person wearing low or flat heels.

Adjustable pedals have been proposed but none of them up to the present time have achieved any degree of commercial success. This is largely because they are cumbersome and expensive and require manual adjustment involving the replacing of fastening screws or equivalent devices and cannot be quickly and easily adjusted by the driver while seated in the vehicle or while the vehicle is in motion.

It is an object of the present invention to provide for an automotive vehicle an improved foot operated throttle control or accelerator pedal adjustable by foot pressure of the driver to various predetermined angular positions relative to the vehicle floor boards to relieve strain and improve the skill of the driver and particularly to compensate for different heights of shoe heels worn by drivers of such vehicles.

A further object resides in the provision of an improved accelerator pedal which can be quickly and easily adjusted by foot pressure of the driver while the driver is seated in the vehicle and, if desired, while the vehicle is in motion.

A still further object resides in the provision of an improved adjustable accelerator pedal which may be sold as a vehicle accessory and may be substituted for the conventional accelerator pedal with which the vehicle is equipped without necessitating any change in any other part of the vehicle.

An addiitonal object resides in the provision of an improved adjustable accelerator pedal that is economical to manufacture, neat in appearance, which operates to control the vehicle throttle in the same manner as the conventional accelerator pedal, and is smilar in appearance to the conventional pedal.

Other objects and advantages will become apparent from a consideration of the following description in conjunction with the accompanying drawings, in which:

Fig. 1 is a perspective view of an adjustable accelerator pedal illustrative of the invention with the two hingedly connected parts spread apart to better illustrate the construction thereof;

Fig. 2, a perspective view of the under side of the improved pedal when the two main parts thereof are close together;

Fig. 3, a top plan view of a fragmentary portion of the improved pedal, various parts being broken away to better illustrate the construction thereof;

Fig. 4, a transverse sectional view on the line 4—4 of Fig. 2;

Figs. 5, 6, 7, and 8, diagrammatic views showing the improved pedal in different positions of adjustment;

Fig. 9, an isometric view of a fragmentary portion of the improved accelerator pedal showing a modified arrangement which operatively connects the pedal to the floor boards of a vehicle.

Figure 14:
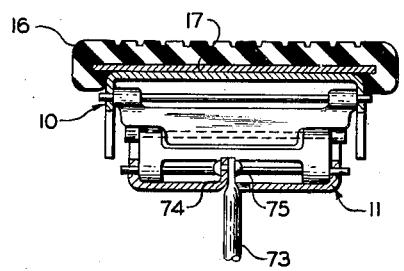
Figures 10, 11:
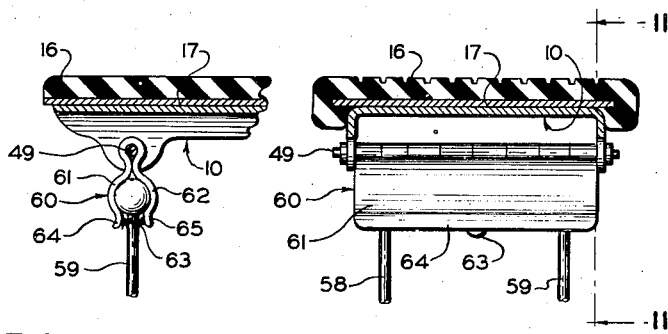
Figure 13:
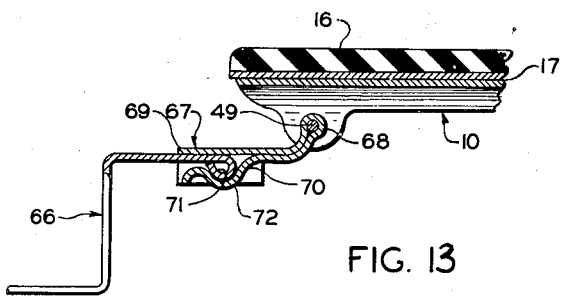

Fig. 10, a transverse sectional view on line 10—10 of Fig. 9 showing in elevation the modified connecting device of Fig. 9;

Fig. 11, a sectional view of a fragmentary portion of the improved pedal, taken on the line 11—11 of Fig. 10;

Fig. 12, an isometric view of a fragmentary portion of an improved accelerator pedal showing a further modified arrangement for operatively connecting the pedal to the floor boards of a vehicle;

Fig. 13, a sectional view on line 13—13 of Fig. 12 showing the further modified connecting device of Fig. 10; and, Fig. 14, a transverse sectional view of the improved pedal showing a modified arrangement for connecting the throttle rod to the pedal.

With continued reference to the drawings and particularly to Fig. 1, the improved pedal comprises an upper main part, generally indicated at 10, and a lower main part, generally indicated at 11, the two parts being hinged together at corresponding ends by a hinge pin 12 in a manner to be presently described in greater detail.

The upper main part 10 comprises a member, preferably formed of sheet metal, having a flat web portion 13 and longitudinal flange portions 14 and 15 extending along the lengthwise edges of the web 13 to provide a member of generally channel shaped cross section. A tread 16, preferably formed of resilient material such as rubber, is secured to the metal part of the upper member in a manner to entirely overlie the web portion 13. The tread may be conveniently secured to the member 10 by means of a supplemental metal plate 17 welded or otherwise secured to the upper surface of the web 13 and being embedded in the material of the tread, as shown in Fig. 4. The tread may be additionally cemented to the plate 17 or to the web 13 and may be provided on its upper surface with longitudinal grooves, as shown in Figs. 3 and 4, or other design to prevent the sole of the driver's shoe from slipping on the surface of the pedal.

The member 11 is also channel shaped in cross section and has a web portion 18 with flanges 19 and 20 extending respectively along the lengthwise edges of the web portion. The flanges of both members are apertured to receive the hinge pin 12, which secures the two members together adjacent the end of the pedal attached to the floor boards of the vehicle. The two members are held in alignment so that the flanges of the member 11 fit into the flanges of the member 10 with sufficient clearance by suitable spacing means 21 and 22 surrounding the pin 12 between adjacent flanges of the two members, and which preferably comprises indented portions of the respective flanges 14 and 15 of member 10. With this construction, the member 10 may swing relative to the member 11 about the axis of pin 12 through a limited range of angular movement. The two members are resiliently urged together to their collapsed position, in which the member 11 fits between the flanges of the member 10 by a suitable coiled torsion spring 23 which surrounds a portion of the pin 12 and has one end engaged in a lug 24 formed by a bent over portion of the flange 20 of the member 11 and the other end engaged by a lug 25 formed by striking up and bending over a portion of the web 13 of member 10.

A portion of the web 13 is struck up and bent to a position at right angles to the web to constitute a ramp 26 located intermediate the ends of the web. This ramp is provided with two spaced notches 27 and 28 and a flat 29 located at successively greater distances from the adjacent surface of the web 13 and connected by inclined edge portions of the ramp.

A portion of the web 18 of member 11 is also struck up to provide a ramp 30 having three notches 31, 32, and 33 arranged at progressively increasing distances from the adjacent surface of the web 18 and connected by inclined edge portions of the ramp. The ramp 30 is positioned lengthwise of the member 11 at a location in which it overlies the ramp 26 when the members 10 and 11 are folded together.

An arm 34 is mounted on the pin 12 by bent over apertured lugs provided at one end of the arm and is held in operative position at one end of the pin by a suitable spacer 35 which surrounds the pin within the spring 23 between the flange 20 and the adjacent lug of the arm 34. The arm 34 is free to swing about the pin 12 in the same manner as the main parts 10 and 11 of the pedal.

A lever 36 is pivotally secured to the arm 34 by a pivot pin or rivet 37 and has a portion extending from the pin 12 between the main parts 10 and 11 and is provided at its outer end with a wedge 38 located in a position to contact the edges of the ramps 26 and 30. This lever is extended sideways to a position outside of the flanges 14 and 19 of the members 10 and 11 and is there provided with a roller over portion 39 and an upstanding tab or abutment 40. The abutment 40 is located at a distance from the pivot pin 37 such as to provide ample leverage for moving the wedge member 38 between the ramps 26 and 30 when outward pressure is applied to the tab 40.

Figure 8:
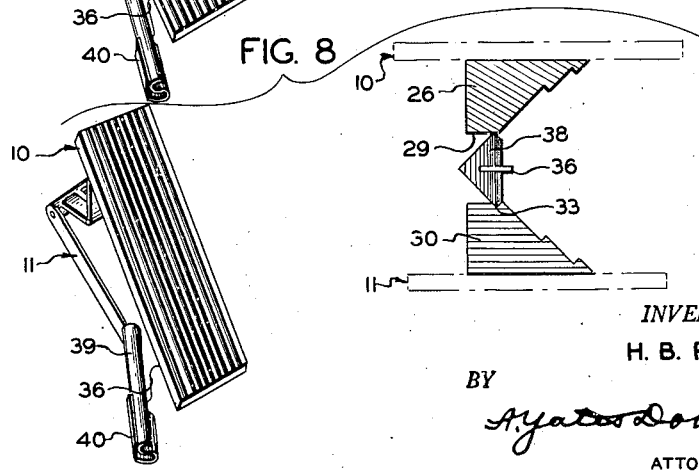

The opposite end of the lever 36 is provided with an extension 36' which contacts the corresponding lug of arm 34 when the portion 39 of the lever has been moved to its limiting position away from the adjacent side of tread 16, as shown in Fig. 8 and in broken lines in Fig. 3, to provide a positive stop for movement of the lever.

Figure 5:
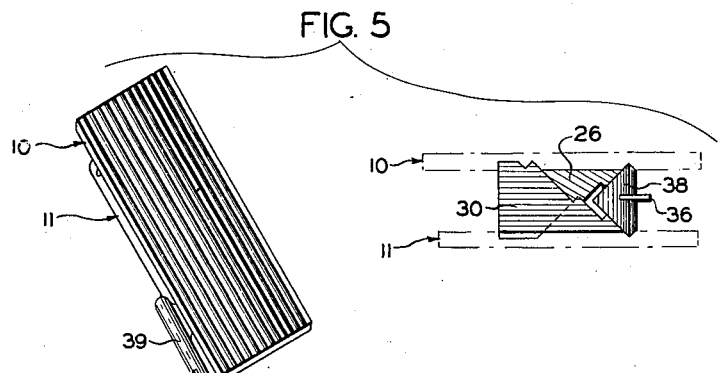

Referring now to Figs. 5, 6, 7, and 8, in Fig. 5 the pedal is shown in its collapsed position in which it corresponds to the form of accelerator pedals conventionally provided on automotive vehicles, the members 10 and 11 being collapsed together. In this position the wedge 38 is at one end of the ramps 26 and 30 and out of engagement with all of the ramp notches.

Figure 6:
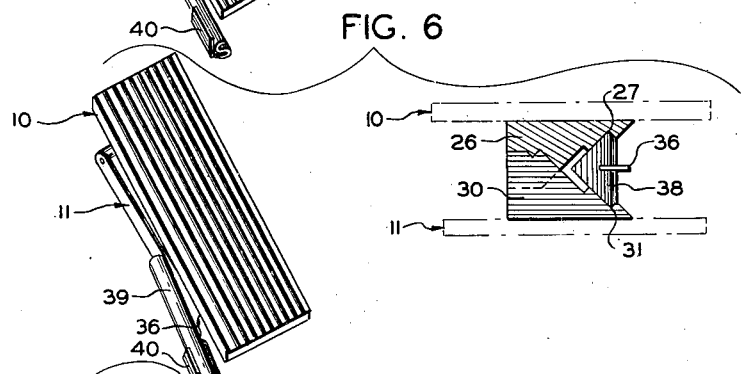

Fig. 6 shows the accelerator pedal in its second position of adjustment to compensate for a moderately low heel, such as a cuban type heel. To obtain this position sufficient pressure is exerted by the end of the shoe heel on the abutment 40 to swing the lever 36 about the pivot pin 37 to move the wedge 38 into the first set of notches 27 and 31, thus separating the members 10 and 11 at their ends opposite the hinge pin 12 to provide a moderate angle between the two members. This increases the angle of the upper member relative to the floor boards and renders it possible for the driver to operate the accelerator pedal at the same relative foot position as if the driver were wearing a low heeled shoe, even though now the driver is wearing a shoe provided with a heel of moderate height.

Figure 7:
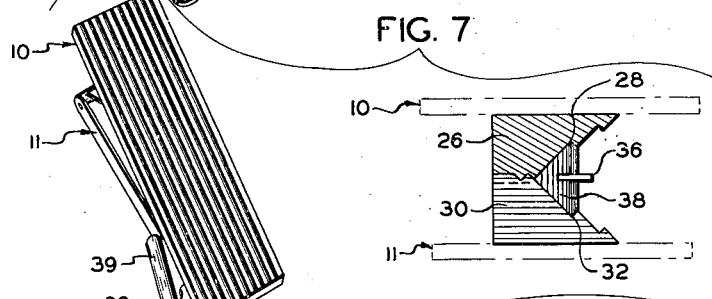

Fig. 7 shows the pedal adjusted for a shoe heel of somewhat greater height such as a medium heel. In order to obtain this adjustment further pressure is exerted by the shoe heel on the abutment 40 to swing the lever 36 about the pivot pin 37 until the wedge 38 is moved into the notches 28 and 32. This sets the member 10 at a steeper angle to the floor boards of the vehicle so that the driver does not experience any inconvenience or fatigue because of the higher type of shoe heel worn.

Fig. 8 illustrates the accelerator pedal adjusted for heels of maximum height. In order to achieve this adjustment, additional pressure is exerted on the abutment 40 swinging the lever 36 about the pivot pin 37 until the wedge 38 is moved to a position in which its lower edge rests in the notch 33 of ramp 30 and its upper edge bears against the flat 29 of ramp 26. In this condition of adjustment the upper member 11 is set at its maximum angle to the floor boards to accommodate the pedal to shoe heels of maximum conventional height. In this position of the lever extension 36' contacts the lug 34' of arms 34 so that further movement of the lever in the same direction is precluded.

At its end opposite the pin 12, member 10 is provided with a link member 41 pivotally secured thereto by a pin 42 extending through the end portions of flanges 14 and 15 and through suitable lugs provided on the link member, and the member 11 is provided with a similar link member 43 pivotally secured thereto by a pin 44 which extends through flanges 19 and 20 and through suitable lugs provided on the link member. The two link members 41 and 43 are provided with hinge type lug portions 45 and 46 respectively, which receive a pin 47 to pivotally secure the two link members together to constitute a hinge or toggle connection at the free ends of the members 10 and 11. The purpose of this connection is to limit the maximum extent that these ends of the members can be separated and to assist in maintaining members 10 and 11 in proper alignment so that they will fold together without interference.

A suitable pedestal 48 is pivotally connected to the end of member 10 adjacent the pin 12 by a hinge pin 49 and is provided with an aperture 50 for a bolt or other fastener by means of which the pedestal is secured to the floor boards of the vehicle. If desired, a conventional ball and socket, preferably made of rubber and carried by the pedal member 10, may be substituted for the pedestal member 48.

An opening 51 is provided at the end portion of member 11 opposite the pin 12 and a portion of the metal struck out to form this opening is left attached to the end of the opening and curved around to provide a concave socket for the reception of the end of a throttle operating shaft extending through the floor board. The end portion of socket member 52 is apertured or slotted to receive the two parts 53 and 54 of a spring wire clamp which is secured to member 11 and provided with curved end portions lying within the socket provided by member 52, which curved end portions fit into an annular groove in the upper end of the throttle operating shaft to operatively secure the shaft to the accelerator pedal.

The web portion 18 of member 11 is also provided with an opening 55 near the pin 12 through which a suitable tool can be inserted to facilitate engaging the corresponding end of spring 23 with the lug 25 formed on member 10.

When the pedal is in any of the adjusted positions shown in Figs. 6, 7 and 8, it may be quickly returned to the position shown in Fig. 5 by a slight pressure or blow on the end of lever 36 carrying abutment 40, the wedge 38 and the various notches being so formed that the wedge will move out of any pair of notches in which it is engaged and permit the two parts of the pedal to return to their collapsed condition. The notches and wedge are so shaped, however, that the wedge will not slip out of the notches in which it is engaged unless actuated by the lever 36 so that accidental collapse of the pedal members is precluded.

It will be noted that the rolled portion 39 of the lever 36 constitutes a form of bridge between the edge of the tread member 16 and the abutment 40 when the lever is in its innermost position, as illustrated in Fig. 5 and at all times provides a surface or platform between the abutment and the tread member. This construction precludes the possibility of the bottom of a small shoe heel going through the space between the abutment and the tread and permits the driver to move the pedal by simply shifting the shoe heel across the tread without raising the heel to prevent its entering the space between the lever and the tread and possibly being caught in this space.

As explained above, the pedestal 48 shown in Fig. 2 pivotally supports the heel end of the pedal on the floor boards of the vehicle. This pedestal comprises a member which may be conveniently formed of sheet metal bent intermediate its length so that its two end portions are disposed substantially at right angles to each other. One leg 56 of this member is provided at the end thereof with a rolled tubular portion 57 which receives the pin 49 and the other leg portion has the aperture 50 provided therein. When the pedestal 48 is secured to the floor boards by a bolt or other suitable fastener extending through the aperture 50 and through a corresponding aperture in the floor boards of the vehicle, the pedal will be pivotally supported by the pin 49 in operative position.

In the modified arrangement shown in Figs. 9, 10 and 11, the vehicle floor boards are provided with a pair of spaced parallel upwardly extending pins 58 and 59 provided on their upper ends with spherical head portions. A sheet metal clip, generally indicated at 60, is provided to pivotally and releasably secure the heel end of the pedal to the pins 58 and 59. This clip comprises two members 61 and 62 hingedly secured together along corresponding edges by the pin 49 passing through registering rolled over tubular portions of the two members. Each of the members is shaped to provide a longitudinally extending trough of partly spherical cross sectional shape and the members are secured together at their edges opposite the hinge connection by a tension spring 63. Adjacent the trough shaped portions the members 61 and 62 are provided with oppositely flaring edge portions 64 and 65 for guiding the heads of the pins 58 and 59 into the opposed trough shaped portions thereof.

With this fitting the accelerator pedal may be mounted on the conventional supporting pins 58 and 59 by placing the member 60 in position such that the outwardly flaring edge portions of the two parts 61 and 62 rest upon the heads of the pins. Downward pressure on the pedal will then force the members 61 and 62 apart against the resiliency of spring 63 permitting the heads of pins 58 and 59 to enter into the trough shaped portions of the members 61 and 62 where they will be held by the spring 63. The pedal will then be operatively supported on the pins 58 and 59 and may be removed by upward pressure on the heel end of the pedal.

In the arrangement shown in Figs. 12 and 13, a bracket, generally indicated at 66, pivotally supports the pedal. This bracket may be conveniently formed of a piece of relatively stiff sheet metal bent intermediate its length to provide two portions disposed substantially at right angles to each other. The bracket is secured to the vehicle in such a manner that the portion connected to the floor board extends above the floor boards substantially at right angles to the surface thereof and the end portion is spaced above the surface of the floor boards and is substantially parallel to this surface. The end of the end portion parallel to the floor boards is folded over to provide a ridge or bead extending across the end of the bracket. A clip 67, which also may be conveniently formed of sheet metal, is provided for attaching the pedal to the bracket 66. The piece of metal forming the clip is folded over intermediate its length to provide a tubular portion 68 which surrounds the hinge pin 49. Two opposed tongues 69 and 70 extend outwardly from the portion 68 and lie one above and one below the end portion 71 of bracket 66 when the clip is in operative position on the bracket. The lower tongue 70 is provided with a transverse trough 72 which receives the bead on the end of the bracket 66 to releasably retain the clip on the bracket.

With the mounting arrangement shown in Figs. 12 and 13, the pedal may be attached by so locating it that the beaded end of the bracket is at the open end of the clip 66. Rearward pressure on the pedal will then force the tongues 69 and 70 apart so that the beaded portion of the bracket is forced between the tongues and into the trough portion 72, in which it is releasably retained by the resiliency of the clip.

In the modified arrangement shown in Fig. 14 the throttle shaft 73 is provided at its upper end with a flattened portion having an aperture therethrough. The lower member 11 of the pedal is provided with a struck up lug 74 also having an aperture therethrough. A pin 75 extending through the apertures pivotally connects the throttle rod 73 to pedal member 11 through lug 74.

As is apparent from the above description and the accompanying drawings, the improved adjustable pedal can conveniently be formed of sheet metal stampings and a rubber tread, is compact, simple and economical to manufacture, operates the throttle in the same manner as the conventional pedal and resembles the conventional pedal in appearance but can be adjusted at any time by simple movement of the throttle controlling foot of a vehicle driver to change its angle and thereby relieve driving strain and compensate its position to any conventional height of shoe heel worn by the driver of the vehicle.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A vehicle accelerator pedal comprising two parts hingedly connected together, one of said parts constituting a tread and the other part being operatively connected to the vehicle throttle operating shaft; and foot actuated means operatively associated with said parts and movable in a plane including the axis of said hinge connection to move said parts to various predetermined angular positions relative to each other, said foot actuated means comprising a lever pivotally associated with said parts, a wedge carried by said lever and a pair of ramps associated one with each of said parts engageable by said wedge.

2. A foot operated throttle control for an automotive vehicle comprising a pivotally mounted tread member attachable to the vehicle floor boards for foot operation of the vehicle throttle and foot operated means operatively associated with said tread member for moving said tread member to and releasably holding it in any one of a plurality of predetermined angular positions about said pivotal mounting and relative to the floor boards of the vehicle, said foot operated means being normally out of engagement with the foot and engageable thereby only to effect the desired adjustment.

3. Foot operated throttle control means for an automotive vehicle comprising a pair of members hingedly connected at corresponding ends, one of said members providing a tread and the other of said members being connected to the throttle operating shaft of the vehicle; and foot actuated means operatively associated with said members for moving said members and holding them in various positions of angular adjustment relative to each other said foot actuated means being normally out of engagement with the foot and engageable thereby only to effect the desired adjustment.

4. A vehicle accelerator pedal comprising two superimposed parts hingedly connected together, one of said parts constituting a tread and the other part being operatively connected to the vehicle throttle operating shaft; and foot actuated means operatively associated with said parts and movable in a plane including the axis of said hinge connection to move said parts to various predetermined angular positions relative to each other said foot actuated means being normally out of engagement with the foot and engageable thereby only to effect the desired adjustment.

5. A vehicle accelerator pedal comprising a pair of parts hingedly connected at corresponding ends, one of said parts carrying a floor board mounting attachment and the other of said parts carrying a throttle operating shaft attachment; and foot operated means pivotally associated with said parts operative to move said parts to and maintain them in various positions of angular adjustment relative to each other said foot operated means being normally out of engagement with the foot and engageable thereby only to effect the desired adjustment.

6. An adjustable accelerator pedal comprising two parts, one carrying a vehicle floor board attachment and the other carrying a throttle operating shaft attachment, a ramp extending from each part toward the other part, each ramp being provided with a plurality of notches progressively positioned at different distances from the adjacent surface of the respective part; and wedge means movable between said ramps to different positions as determined by the locations of said notches to separate said parts by various predetermined angular amounts.

7. An adjustable accelerator pedal comprising two parts, one carrying a tread and the other carrying a throttle operating shaft attachment; a ramp extending from each part toward the other part, each ramp being provided with a plurality of notches progressively positioned at different distances from the adjacent surface of the respective part; wedge means movable between said ramps to different positions as determined by the locations of said notches to separate said parts by various predetermined angular amounts; an arm pivotally mounted on the hinge connection between said pedal parts; and a wedge carrying lever mounted on said arm for movement about an axis substantially at right angles to the axis of said hinge connection.

8. An adjustable accelerator pedal comprising an upper part of channel shaped cross section; a lower part of channel shaped cross section; a hinge pin pivotally connecting said parts at corresponding ends, spacers on said hinge pin maintaining said members in alignment so that the flanges of one part will fit between the flanges of the other part; and foot operated means mounted on said hinge pin and associated with said parts for holding said parts in various positions of angular adjustment relative to each other.

9. An adjustable accelerator pedal comprising a pair of elongated members each having a flange along each longitudinal edge thereof; a hinge pin extending through said flanges at corresponding ends of said members to hingedly secure said members together; a spring between said members resiliently urging said members together to a condition in which the flanges of one member lie within the flanges of the other member; and means for separating said members to position one of said members at various predetermined positions of angular adjustment relative to the other comprising a ramp associated with each member having a plurality of notches therein; a wedge movable between said ramps; and a foot operated wedge carrying lever pivotally associated with said members.

10. An accelerator pedal as defined in claim 9 wherein said spring comprises a coiled torsion spring surrounding a portion of said hinge pin.

11. An adjustable accelerator pedal comprising a pair of elongated members each having a flange along each longitudinal edge thereof; a hinge pin extending through said flanges at corresponding ends of said members to hingedly secure said members together; a spring between said members resiliently urging said members together to a condition in which the flanges of one member lie within the flanges of the other member; means for separating said members to position one of said members at various predetermined positions of angular adjustment relative to the other comprising a ramp associated with each member having a plurality of notches therein, a wedge movable between said ramps and a foot operated wedge carrying lever pivotally associated with said members; and a pair of link members pivotally connected one to each end of each of said members opposite said hinge pin and pivotally connected together to provide a pivoted link connection between the ends of said members to limit the separation thereof.

12. An adjustable accelerator pedal comprising a pair of flanged members; a hinge pin extending through said flanges hingedly connecting said members at corresponding ends thereof; foot operated means associated with said members for holding them in various positions of angular adjustment relative to each other; an attachment for securing said members to the floor boards of a vehicle; and a hinge pin extending through the flanges of at least one of said members and through said attachment.

13. An adjustable accelerator pedal as defined in claim 9 wherein said ramps are provided with notches at progressively varying distances from the adjacent surfaces of the corresponding members, so shaped that said wedge member is movable in either direction along said ramps by moderate shoe heel pressure on the wedge carrying lever, and will remain in position in selected notches against accidental displacement thereof.

14. In an accelerator pedal, a tread portion and means associated with said tread portion and adjustable by movement of the shoe heel of the driver to change the angular position of said tread portion to compensate for shoe heels of different heights said means being normally out of engagement with the foot and engageable thereby only to effect the desired adjustment.

15. In combination with a vehicle accelerator pedal and pedal supporting means comprising a pair of spaced pins upstanding from the floor boards of the vehicle and provided with spherical head portions; a clip for pivotally and releasably securing said pedal to said pins comprising a pair of members each having a longitudinal trough portion therein, an outwardly flared edge portion at one side of the trough portion and a rolled hinge portion at the opposite side of the trough portion; a hinge pin extending through said rolled hinge portions securing said two members together and secured at its ends to said pedal; and a spring resiliently urging said two portions to closed position to releasably retain said clip on the heads of said pins.

16. In combination with a floor board supported bracket having a portion spaced above and parallel to the floor boards and having a bead on the end thereof, means for releasably attaching an accelerator pedal to said bracket comprising a clip having a pair of opposed tongue portions joined at corresponding ends by a substantially tubular portion, one of said tongue portions having a trough to receive the bead on said bracket to releasably secure said clip to said bracket; and a hinge pin extending through said substantially tubular portion pivotally connecting said clip to the pedal.

17. An adjustable accelerator pedal comprising two parts, one carrying a tread and the other carrying a throttle operating shaft attachment; a ramp extending from each part toward the other part, each ramp being provided with a plurality of notches progressively positioned at different distances from the adjacent surface of the respective part; wedge means movable between said ramps to different positions as determined by the locations of said notches to separate said parts by various predetermined angular amounts; an arm pivotally mounted on the hinge connection between said pedal parts; a wedge carrying lever mounted on said arm for movement about an axis substantially at right angles to the axis of said hinge connection; and an extension on said lever engageable with a portion of said arm to constitute a stop for limiting movement of said lever in a direction separating said pedal parts.

18. An adjustable accelerator pedal as defined in claim 6 wherein said throttle operating shaft attachment comprises a struck up tongue in said other pedal part providing a concave socket for the upper end of said throttle operating shaft; and a spring clip carried by said other pedal part engageable in a groove in said throttle operating shaft when the upper end of said shaft is in said socket to releasably secure said throttle operating shaft to said pedal.

19. An adjustable accelerator pedal as defined in claim 6 wherein said throttle operating shaft attachment comprises a flattened apertured upper end portion on said throttle operating shaft, a struck up apertured lug on said other part of the accelerator pedal, and a fastening member pivotally connecting said shaft to said lug.

HOUSTON B. RODD.

REFERENCES CITED

The following references are of record in the file of this patent:

UNITED STATES PATENTS

| Number | Name | Date |
|---|---|---|
| 789,813 | Longley | May 16, 1905 |
| 850,507 | Waldon | Apr. 16, 1907 |
| 1,153,743 | Winton et al. | Sept. 14, 1915 |
| 1,213,826 | Bloom | Jan. 30, 1917 |
| 1,412,870 | Jefferson et al. | Apr. 18, 1922 |
| 1,671,169 | Swain | May 29, 1928 |
| 1,782,035 | Gianera | July 2, 1928 |
| 1,862,453 | Bailey | June 7, 1932 |
| 2,048,448 | Hofer | June 28, 1933 |
| 2,123,299 | Gibbons | July 12, 1938 |
| 2,167,868 | Best | Aug. 1, 1939 |